US011193680B1

(12) United States Patent
Caballero et al.

(10) Patent No.: US 11,193,680 B1
(45) Date of Patent: Dec. 7, 2021

(54) PERSONAL MISTER SYSTEM

(71) Applicants: Eduardo Caballero, Green Cove Springs, FL (US); Lois A. Caballero, Green Cove Springs, FL (US)

(72) Inventors: Eduardo Caballero, Green Cove Springs, FL (US); Lois A. Caballero, Green Cove Springs, FL (US)

( * ) Notice: Subject to any disclaimer, the term of this patent is extended or adjusted under 35 U.S.C. 154(b) by 0 days.

(21) Appl. No.: 17/327,092

(22) Filed: May 21, 2021

Related U.S. Application Data

(60) Provisional application No. 63/028,091, filed on May 21, 2020.

(51) Int. Cl.
*F24F 6/14* (2006.01)

(52) U.S. Cl.
CPC .......... *F24F 6/14* (2013.01); *F24F 2006/146* (2013.01); *F24F 2221/12* (2013.01); *F24F 2221/38* (2013.01)

(58) Field of Classification Search
CPC ... B01F 3/04049; F24F 6/14; F24F 2006/146; F24F 2221/12; F24F 2221/38
USPC ............ 261/78.2, DIG. 3, DIG. 43; 239/289, 239/548, 567
See application file for complete search history.

(56) References Cited

U.S. PATENT DOCUMENTS

| | | | | | |
|---|---|---|---|---|---|
| 2,632,163 | A | * | 3/1953 | Spandau | A62B 17/003 2/457 |
| 3,352,364 | A | * | 11/1967 | De Coste | A62C 99/009 169/48 |
| 4,807,813 | A | * | 2/1989 | Coleman | B62J 99/00 239/153 |
| 5,205,306 | A | * | 4/1993 | Peterson | A47K 3/287 134/104.2 |
| 5,370,278 | A | * | 12/1994 | Raynie | A63H 33/00 222/144.5 |
| 5,620,140 | A | * | 4/1997 | Utter | B05B 15/62 239/153 |
| 6,158,669 | A | * | 12/2000 | Louis | B05B 9/0805 239/146 |
| 6,581,855 | B1 | * | 6/2003 | Cook | A62C 99/0072 239/548 |
| 6,886,759 | B1 | * | 5/2005 | Okronick | A45B 3/00 239/16 |
| 8,496,232 | B1 | * | 7/2013 | Nelson | F24F 5/0035 261/5 |
| 2003/0150938 | A1 | * | 8/2003 | Palmer | B05B 17/08 239/461 |
| 2008/0023570 | A1 | * | 1/2008 | Tu | B05B 17/0646 239/102.1 |

(Continued)

*Primary Examiner* — Charles S Bushey
(74) *Attorney, Agent, or Firm* — Ashkan Najafi

(57) ABSTRACT

A personal mister system includes a manually operated mist delivery assembly having a trigger actuated spray bottle and water delivery tubing configured to deliver water from the spray bottle to a series of mister nozzles positioned along a portion of the water delivery tubing provided in a circular configuration. The portion of the water delivery tubing provided in a circular configuration is removably attachable to a user selected hat. A bottle carrier is further provided for carrying the spray bottle in a handsfree manner. The device supplies mist to a user to lower the body temperature of the user and provide immediate cooling effects.

18 Claims, 21 Drawing Sheets

(56) References Cited

U.S. PATENT DOCUMENTS

2008/0048051 A1* 2/2008 Chang .................. A45B 11/04
239/289

* cited by examiner

PERSONAL MISTER SYSTEM

CROSS REFERENCE TO RELATED APPLICATIONS

This is a non-provisional patent application that claims priority to and benefit of U.S. provisional patent application No. 63/028,091 filed May 21, 2020, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to misters and cooling systems and, more particularly, to a specially designed misting system for personal use.

Prior Art

When engaged in rigorous activities, such as biking, there is a significant tendency for overheating. Such a tendency is exacerbated in conditions of intense sun, high ambient temperatures, and high humidity. These conditions not only make such a person feel the sensation of being uncomfortably hot, but can actually increase his/her body temperature to a dangerous level. As a result, it is highly advisable to drink water to aid the body with its natural cooling ability. At times, however, the body's ability to regulate temperature internally is compromised by both the extent of activity, and rising ambient temperatures. Existing solutions to this problem, include the use of water bottles and/or fans, which generally only move around hot ambient air and thus are not effective. A suitable alternative solution is desired.

Accordingly, a need remains for portable misting system in order to overcome at least one of the above-noted shortcomings. The exemplary embodiment(s) satisfy such a need by a personal misting system that is convenient and easy to use, lightweight yet durable in design, versatile in its applications, and designed to quickly lower the body temperature of a user-wearer.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially configured personal misting system. These and other objects, features, and advantages of the non-limiting exemplary embodiment(s) are provided by a personal mister system including a mist delivery assembly including a spray bottle having a trigger, a plurality of water-misting nozzles, a fluid distribution tube in fluid communication with the spray bottle and the water-misting nozzles, and a plurality of couplings removably affixed to the water-misting nozzles and the fluid distribution tube. Advantageously, the fluid distribution tube is configured to evenly and uniformly deliver water, when the trigger is actuated, from the spray bottle to the water-misting nozzles positioned along a distal end of the fluid distribution tube oriented in a circular configuration. A bottle carrier is configured to support the spray bottle at a user body, and a plurality of fasteners are affixed to the fluid distribution tube. Notably, the fluid distribution tube is removably attached to an existing user headwear via the fasteners. Advantageously, the plurality of water-misting nozzles are located downstream of the spray bottle (located at the user's waist or back) and thereabove (at the user's head) while employed by the user.

In a non-limiting exemplary embodiment, the water-misting nozzles are equidistantly spaced apart along a circumferential length of the distal end of the fluid distribution tube, wherein the water-misting nozzles are aligned in a circular configuration In a non-limiting exemplary embodiment, the couplings include: a first coupling removably affixed to an egress spout of the spray bottle and a proximal end of the fluid distribution tube, and a group of second couplings directly connected to the water-misting nozzles and equidistantly spaced apart along a circumferential length of the distal end of the fluid distribution tube.

In a non-limiting exemplary embodiment, the group of second couplings are coextensively shaped.

In a non-limiting exemplary embodiment, the proximal end of the fluid distribution tube is flexible and has a first diameter, the distal end of the fluid distribution tube is flexible and has a second diameter, wherein the second diameter is smaller than the first diameter.

In a non-limiting exemplary embodiment, the personal mister system further includes a filter intermediately positioned between the proximal end and the distal end of the fluid distribution tube.

In a non-limiting exemplary embodiment, each of the water-misting nozzles and an associated one of the group of second couplings are selectively and contemporaneously rotated about an axis defined along a longitudinal length of the distal end of the fluid distribution tube such that mist is channeled downwardly towards a target zone of the user.

In a non-limiting exemplary embodiment, each of the water-misting nozzles and the associated one of the group of second couplings are disposed exterior of the existing user headwear.

In a non-limiting exemplary embodiment, the spray bottle includes a primary water retaining reservoir, and an auxiliary reservoir removably attached to the primary water retaining reservoir. Advantageously, the mist delivery assembly further includes a water pump, a controller, and a communications device operably situated within the auxiliary reservoir wherein the water pump is in fluid communication with the primary water retaining reservoir. An auxiliary electronic device is located exterior of the spray bottle and is in operable communication with the communications device. Advantageously, such an auxiliary electronic device is configured to toggle the pump between operating and non-operating modes, respectively, for selectively discharging fluid out from the primary water retaining reservoir and to the water-misting nozzles (e.g., hands-free operation).

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
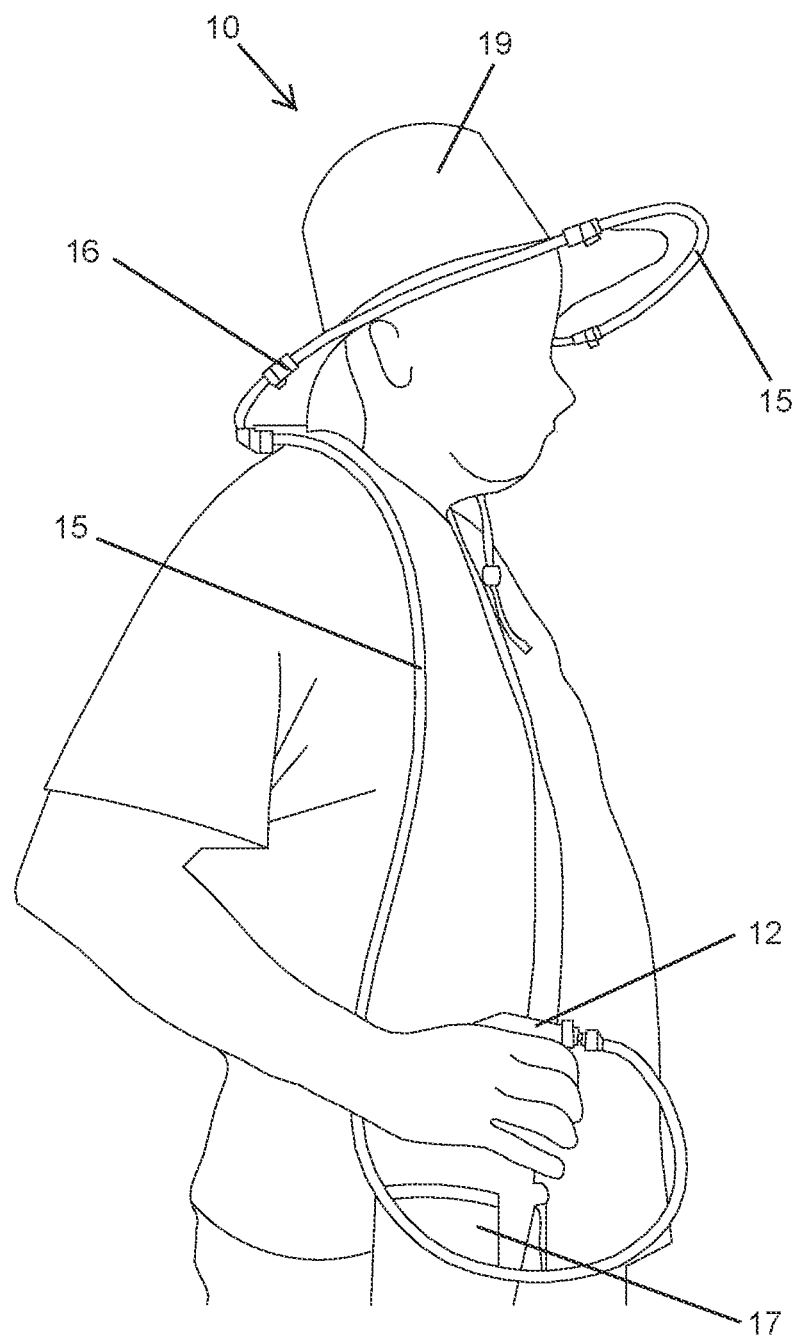
FIG. 1 is a perspective view of a personal mister system employed by a user, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means ±15% of the numerical.

If used herein, "substantially" means largely if not wholly that which is specified but so close that the difference is insignificant.

A non-limiting exemplary embodiment(s) of the present disclosure is referred to generally in FIGS. 1-21 and are intended to provide a portable personal mister system 10. It should be understood that the exemplary embodiment(s) may be used to quickly lower a body temperature of a user-wearer, and should not be limited to any particular personal mister system 10 described herein.

The non-limiting exemplary embodiment(s) is/are referred to generally in FIGS. 1-21 and is/are intended to provide a personal mister system 10 including a mist delivery assembly 11 including a spray bottle 12 having a trigger 13, a plurality of water-misting nozzles 14, a fluid distribution tube 15 in fluid communication with the spray bottle 12 and the water-misting nozzles 14, and a plurality of couplings 16 removably affixed to the water-misting nozzles 14 and the fluid distribution tube 15. Advantageously, the fluid distribution tube 15 is configured to evenly and uniformly deliver water, when the trigger 13 is actuated, from the spray bottle 12 to the water-misting nozzles 14 positioned along a distal end 15a of the fluid distribution tube 15 oriented in a circular configuration. A bottle carrier 17 is configured to support the spray bottle 12 at a user body, and a plurality of fasteners 18 are affixed to the fluid distribution tube 15. Notably, the fluid distribution tube 15 is removably attached to an existing user headwear 19 via the fasteners 18. Advantageously, the plurality of water-misting nozzles 14 are located downstream of the spray bottle 12 (located at the user's waist or back) and thereabove (at the user's head) while employed by the user. Such a structural configuration yields the new, useful, and unpredicted result of ensuring fluid is evening and adequately distributed to each dispensing nozzle along the non-linear travel path of the fluid distribution tube 15.

In a non-limiting exemplary embodiment, the water-misting nozzles 14 are equidistantly spaced apart along a circumferential length 20 of the distal end 15a of the fluid distribution tube 15, wherein the water-misting nozzles 14 are aligned in a circular configuration. Such a structural configuration yields the new, useful, and unpredicted result of ensuring fluid is evening and adequately distributed to each dispensing nozzle along the non-linear travel path of the fluid distribution tube 15.

In a non-limiting exemplary embodiment, the couplings 16 include: a first coupling 16a removably affixed to an egress spout 22 of the spray bottle 12 and a proximal end 15b of the fluid distribution tube 15, and a group of second couplings 16b directly connected to the water-misting nozzles 14 and equidistantly spaced apart along a circumferential length 20 of the distal end 15a of the fluid distribution tube 15. Such a structural configuration yields the new, useful, and unpredicted result of ensuring fluid is evening and adequately distributed to each dispensing nozzle along the non-linear travel path of the fluid distribution tube 15.

In a non-limiting exemplary embodiment, the group of second couplings 16b are coextensively shaped. Such a structural configuration yields the new, useful, and unpredicted result of ensuring fluid is evening and adequately distributed to each dispensing nozzle along the non-linear travel path of the fluid distribution tube 15.

In a non-limiting exemplary embodiment, the proximal end 15b of the fluid distribution tube 15 is flexible and has a first diameter 24, the distal end 15a of the fluid distribution tube 15 is flexible and has a second diameter 25, wherein the second diameter 25 is smaller than the first diameter 24. Such a structural configuration yields the new, useful, and unpredicted result of ensuring fluid is evening and adequately distributed to each dispensing nozzle along the non-linear travel path of the fluid distribution tube 15.

In a non-limiting exemplary embodiment, the personal mister system 10 further includes a filter 26 intermediately positioned between the proximal end 15b and the distal end 15a of the fluid distribution tube 15. Such a structural configuration yields the new, useful, and unpredicted result of ensuring fluid is evening and adequately distributed to each dispensing nozzle along the non-linear travel path of the fluid distribution tube 15.

In a non-limiting exemplary embodiment, each of the water-misting nozzles 14 and an associated one of the group of second couplings 16b are selectively and contemporaneously rotated about an axis 27 defined along a longitudinal length of the distal end 15a of the fluid distribution tube 15 such that mist is channeled downwardly towards a target zone of the user. Such a structural configuration yields the new, useful, and unpredicted result of ensuring fluid is evening and adequately distributed to each dispensing nozzle along the non-linear travel path of the fluid distribution tube 15.

In a non-limiting exemplary embodiment, each of the water-misting nozzles 14 and the associated one of the group of second couplings 16b are disposed exterior of the existing user headwear 19. Such a structural configuration yields the new, useful, and unpredicted result of ensuring fluid is evening and adequately distributed to each dispensing nozzle along the non-linear travel path of the fluid distribution tube 15.

In a non-limiting exemplary embodiment, the spray bottle 12 includes a primary water retaining reservoir 28, and an auxiliary reservoir 29 removably attached to the primary water retaining reservoir 28. Advantageously, the mist delivery assembly 11 further includes a water pump 30, a controller 32, and a communications device 33 operably situated within the auxiliary reservoir 29 wherein the water pump 30 is in fluid communication with the primary water retaining reservoir 28. An auxiliary electronic device 35 is located exterior of the spray bottle 12 and is in operable communication with the communications device 33. Advantageously, such an auxiliary electronic device 35 is configured to toggle the pump between operating and non-operating modes, respectively, for selectively discharging fluid out from the primary water retaining reservoir 28 and to the water-misting nozzles 14 (e.g., hands-free operation). Such a structural configuration yields the new, useful, and unpredicted result of ensuring fluid is evening and adequately distributed to each dispensing nozzle along the non-linear travel path of the fluid distribution tube 15.

Referring to FIGS. 1-21 in general, in a non-limiting exemplary embodiment(s), the personal mister system 10 is provided and features both a manually-operated (e.g., hand squeeze the trigger) and automated (e.g., hands-free, voice-activated) mist delivery assembly 11 which may be used in combination with a hat 19 or other headwear 19. The mist delivery assembly 11 includes water delivery tubing 15 connected to and in communication with a spray bottle 12 and a series of mister nozzles 14 configured to deliver water pumped 14 from the spray bottle 12 in the form of mist.

Figure 2:
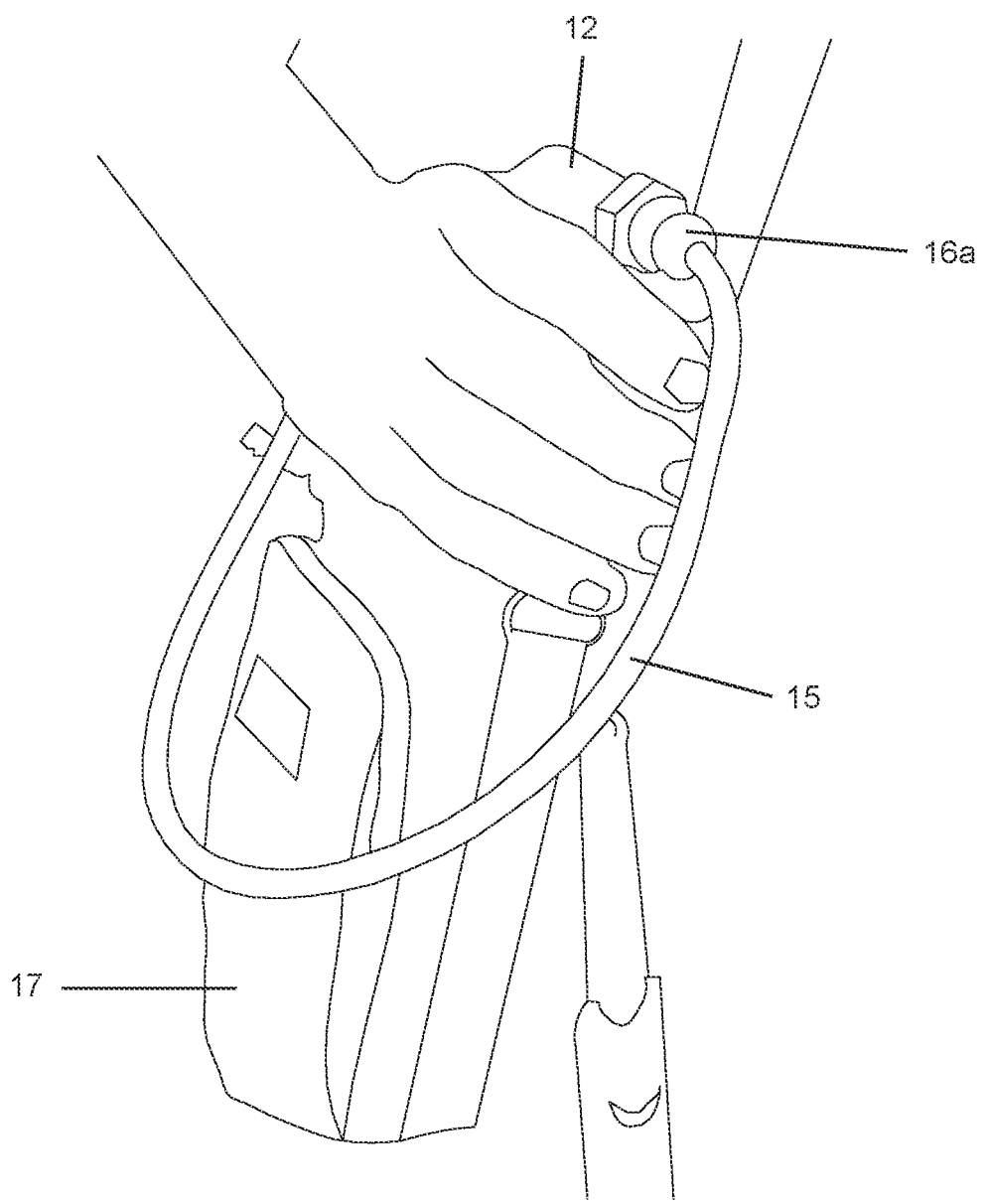
FIG. 2 is an enlarged perspective view of the spray bottle shown in FIG. 1.
Figure 3:
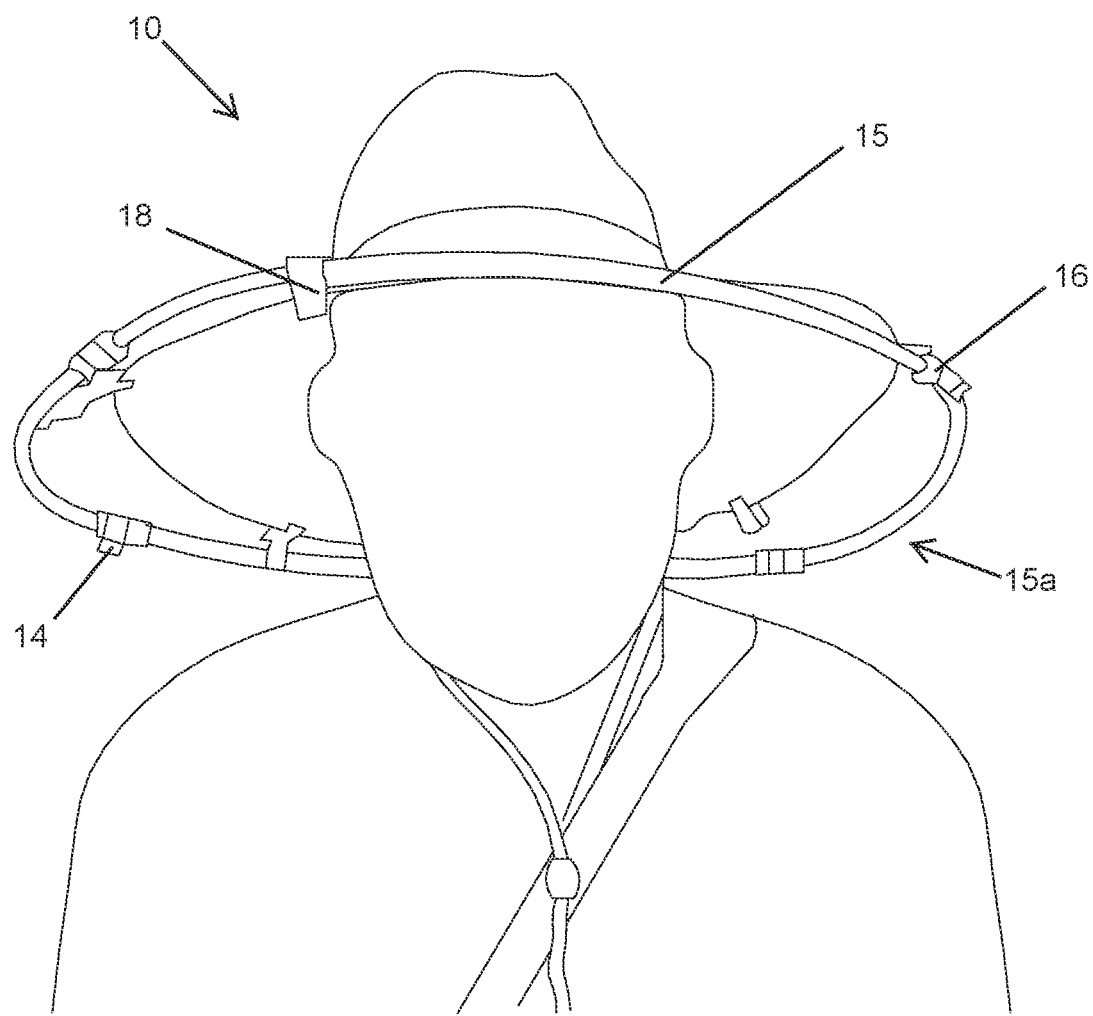
FIG. 3 is an enlarged front elevational view of the fluid distribution tube and nozzles shown in FIG. 1.
Figure 4:
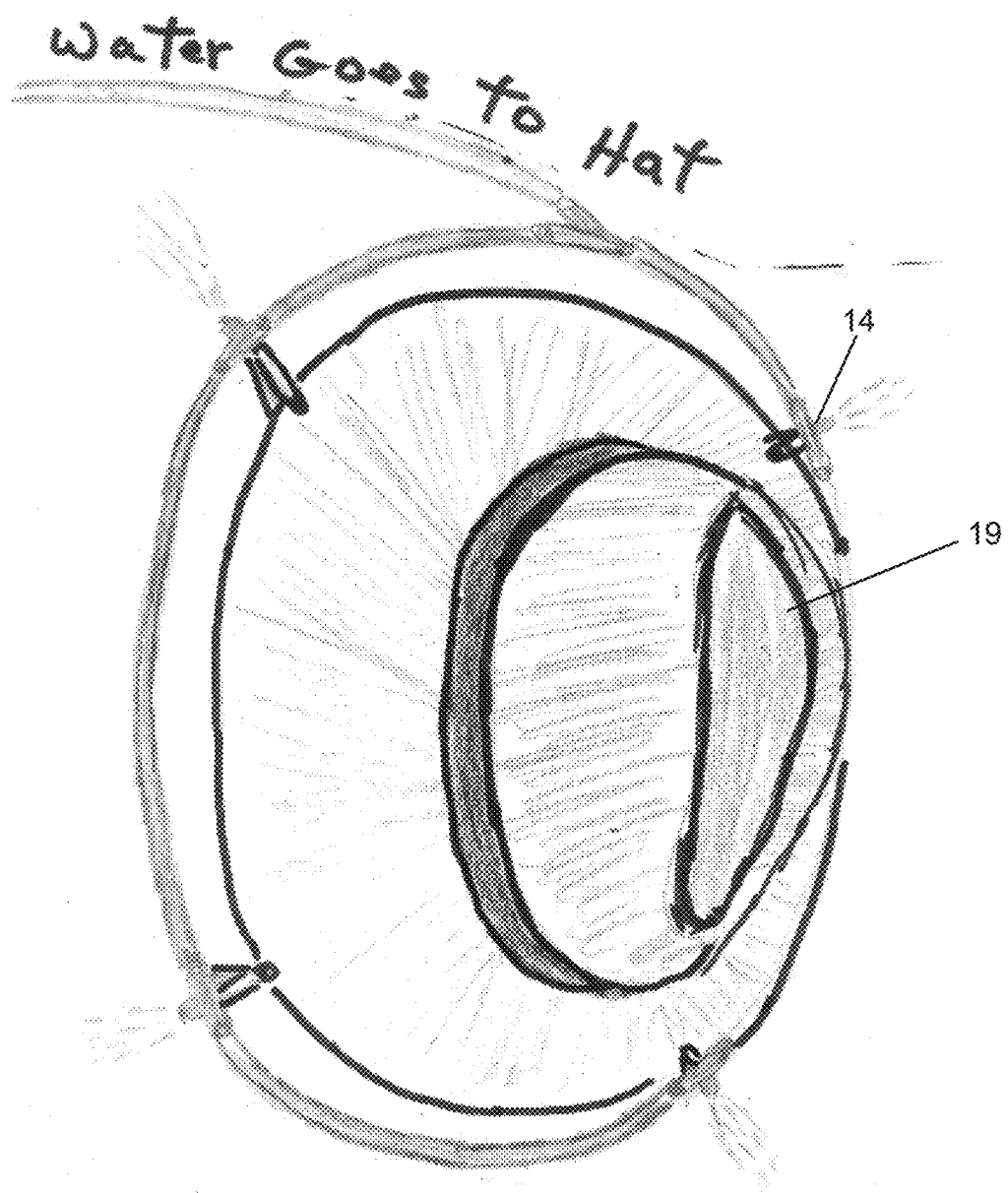
FIG. 4 is a perspective view of the fluid distribution tube and nozzles affixed to a headwear.
Figure 5:
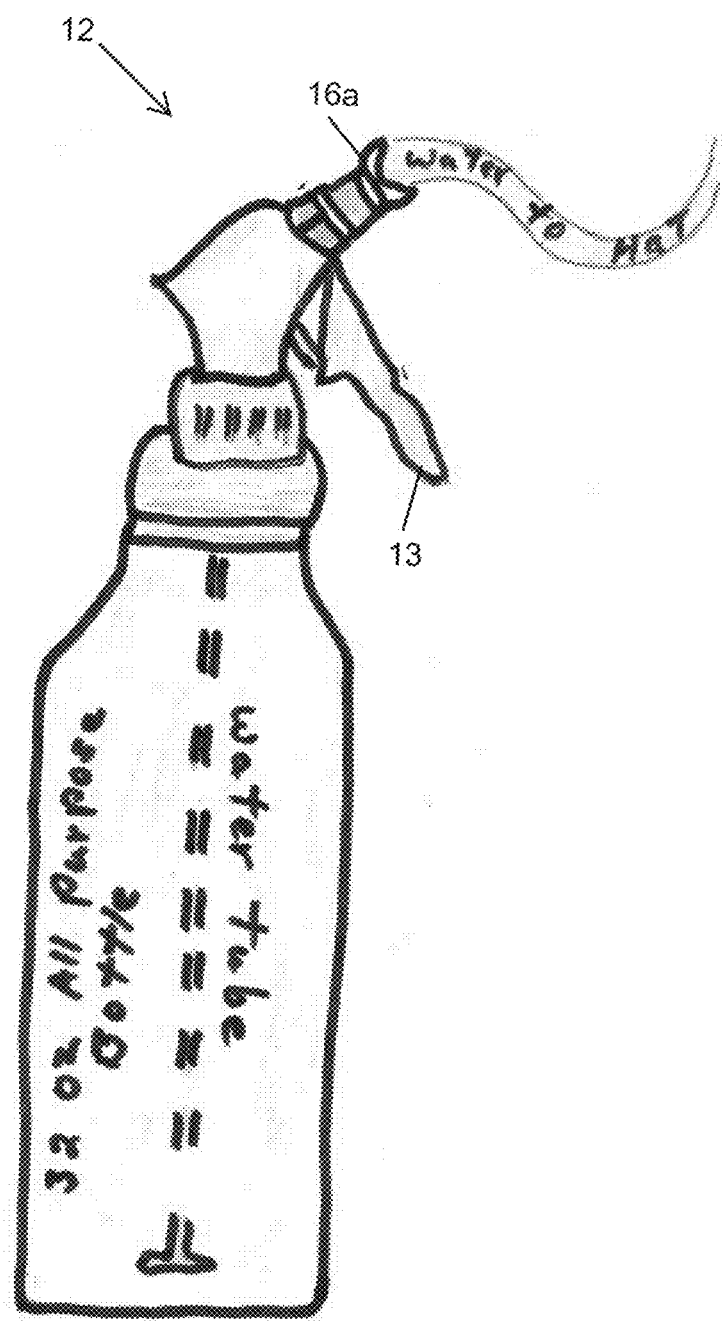
FIG. 5 is side elevational view of a spray bottle, in accordance with a non-limiting exemplary embodiment of the present disclosure.

As shown in FIG. 2, the spray bottle 12 features a trigger 13 for hand pumping water from the spray bottle 12 through the water delivery tubing 15 of the mist delivery assembly 11 to a portion of the water delivery tubing 15 provided in a circular configuration. The portion of the water delivery tubing 15 provided in a circular configuration encircles an outer circumference of a hat 19. The series of mister nozzles 14 are positioned along the water delivery tubing 15 extending along the outer circumference of the hat 19. As shown in the figures, the circular portion of the water delivery tubing 15 is connected to a hat 19 using suitable fasteners 18. In a preferred embodiment, the fasteners 18 include four alligator clips with a snap fit clear vinyl strap. The mist delivery assembly 11 further includes an insulated canvas bottle carrier 17 with a waist or shoulder strap for conveniently carrying the water bottle in a hands-free manner.

The personal mister system 10 which may be retrofit to a user selected hat 19 includes the water delivery tubing 15 connected to and in communication with the spray bottle 12 hosted within the bottle carrier 17 and a series of mister nozzles 14 positioned along the circular portion of the water delivery tubing 15. The components of the personal mister system 10 work in conjunction to provide immediate cooling effects for a user. The personal mister system 10 provides 360 degree misting above and around a user's head which dissipates down to the rest of a user's body allowing for quickly lowering a user's body temperature.

In a preferred embodiment, the personal mister system 10 comprises the following components:
¼ inch ODX 0.170-inch ID clear tubing
¼×¼×¼ inch 3-way union tee quick connect push
Four 10/24 thread brass misting nozzles
Four clip-lock tees for the 10/24 thread misting nozzles
Copolymer tube fitting adapter ¼ inch tube OD×¼ inch NPTF female quick connect push
HDPE 32 oz/1000 ML with 28/40 mouth all-purpose spray bottle 12 with trigger 13
½ inch hitch pin clip
One 32 oz insulated water bottle holder with shoulder strap
Power grip petal mounting tape
Four alligator clips with snap fit clear vinyl strap
14/8"×½"×¹/₁₆" O-ring Some of the figures show a top view of the personal mister system 10 including the portion of water delivery tubing 15 provided in a circular configuration attached to a hat 19. The series of mister nozzles 14 are equidistantly spaced along the water delivery tubing 15 and configured to deliver mist. As shown in the figures, the water delivery tubing 15 is attached to the hat 19 via fasteners 18 such as but not limited to alligator clips. The water delivery tubing 15 is removably coupled to the hat 19 and may be interchangeably used with a variety of user selected hats 19 and other headwear 19.

Now referring to FIGS. 1-21, the spray bottle 12 of the personal mister system 10 is shown. The spray bottle 12 includes the trigger 13 for pumping water stored within the spray bottle 12 through the water delivery tubing 15 towards the mister nozzles 14. The spray bottle 12 is connected to the water delivery tubing 15 using a female connection fitting or other suitable coupling means.

Figure 6:
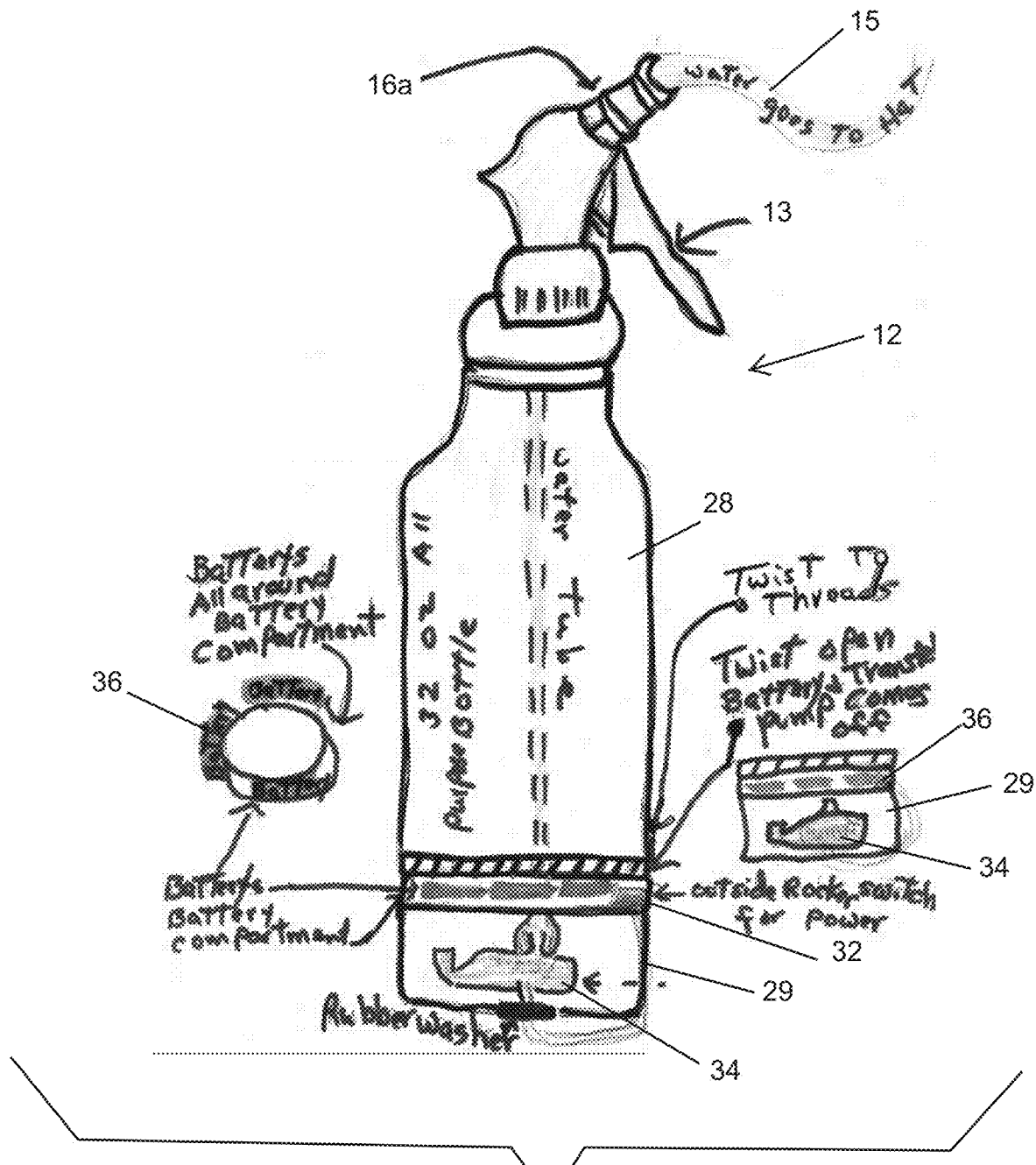
FIG. 6 is a side elevational view of a spray bottle having a primary fluid-retaining reservoir and an auxiliary reservoir detachably affixed thereto, in accordance with a non-limiting exemplary embodiment of the present disclosure.
Figure 7:
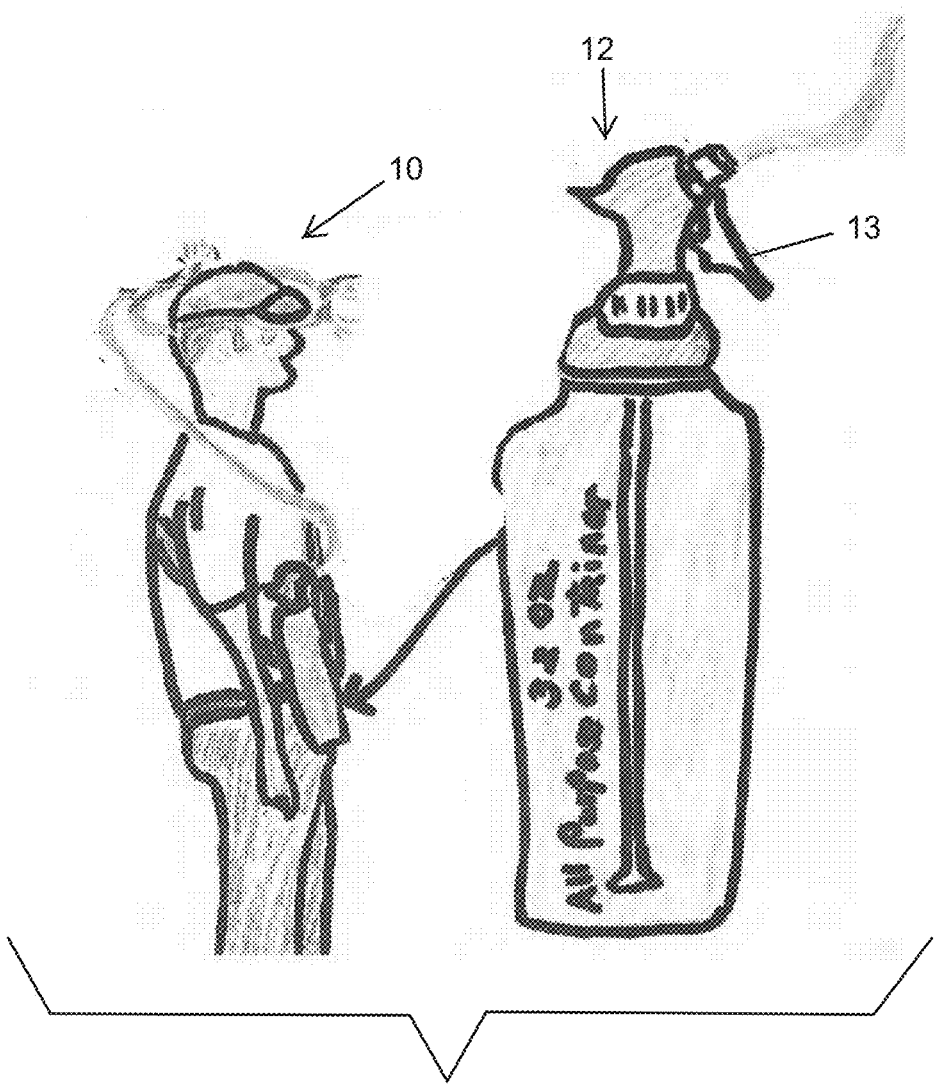
FIG. 7 is another side elevational view of the spray bottle employing a female quick connect coupling in fluid communication with the fluid distribution tube.
Figure 8:
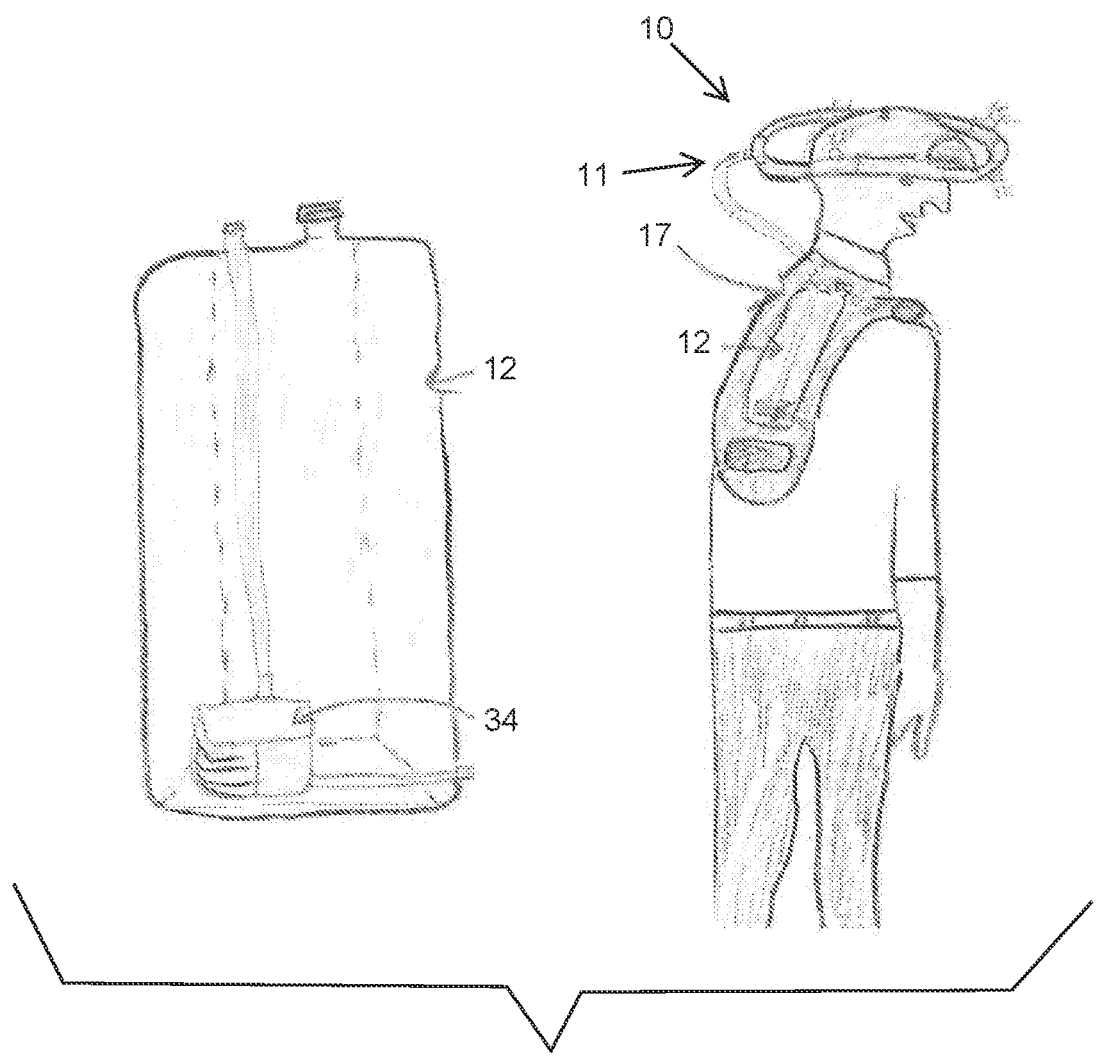
FIG. 8 is a perspective view of the personal mister system employing a power-operated fluid retaining reservoir without a trigger nozzle to allow voice activation and hands-free operation of fluid flow out from the reservoir, in accordance with a non-limiting exemplary embodiment of the present disclosure.
Figure 9:
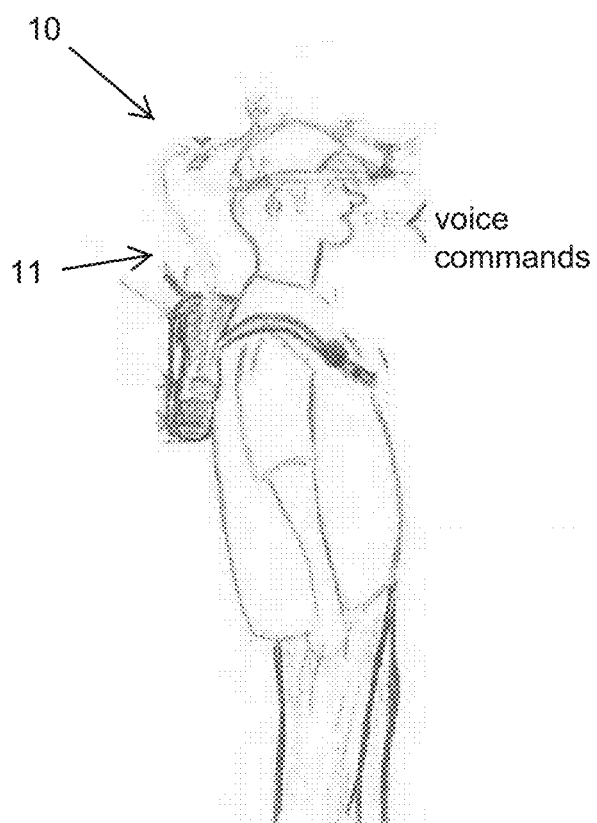
FIG. 9 is a side elevational view of the personal mister system shown in FIG. 8, wherein an insulated reservoir holder is supported over the user's shoulders, in accordance with a non-limiting exemplary embodiment of the present disclosure.
Figure 10:
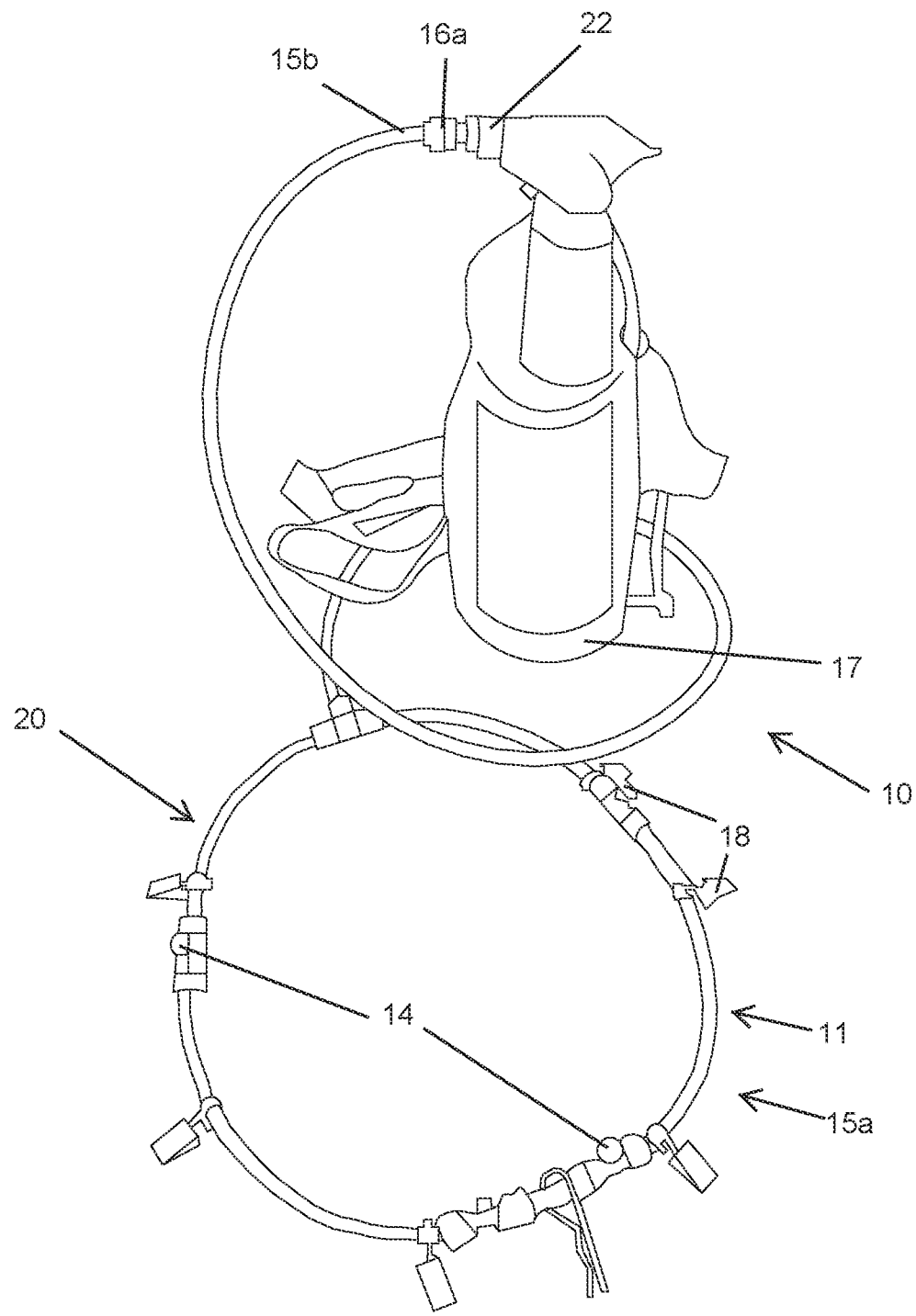
FIG. 10 is another perspective view of the personal mister system having a plurality of fasteners affixed to the fluid distribution tube, in accordance with a non-limiting exemplary embodiment of the present disclosure.
Figure 11:
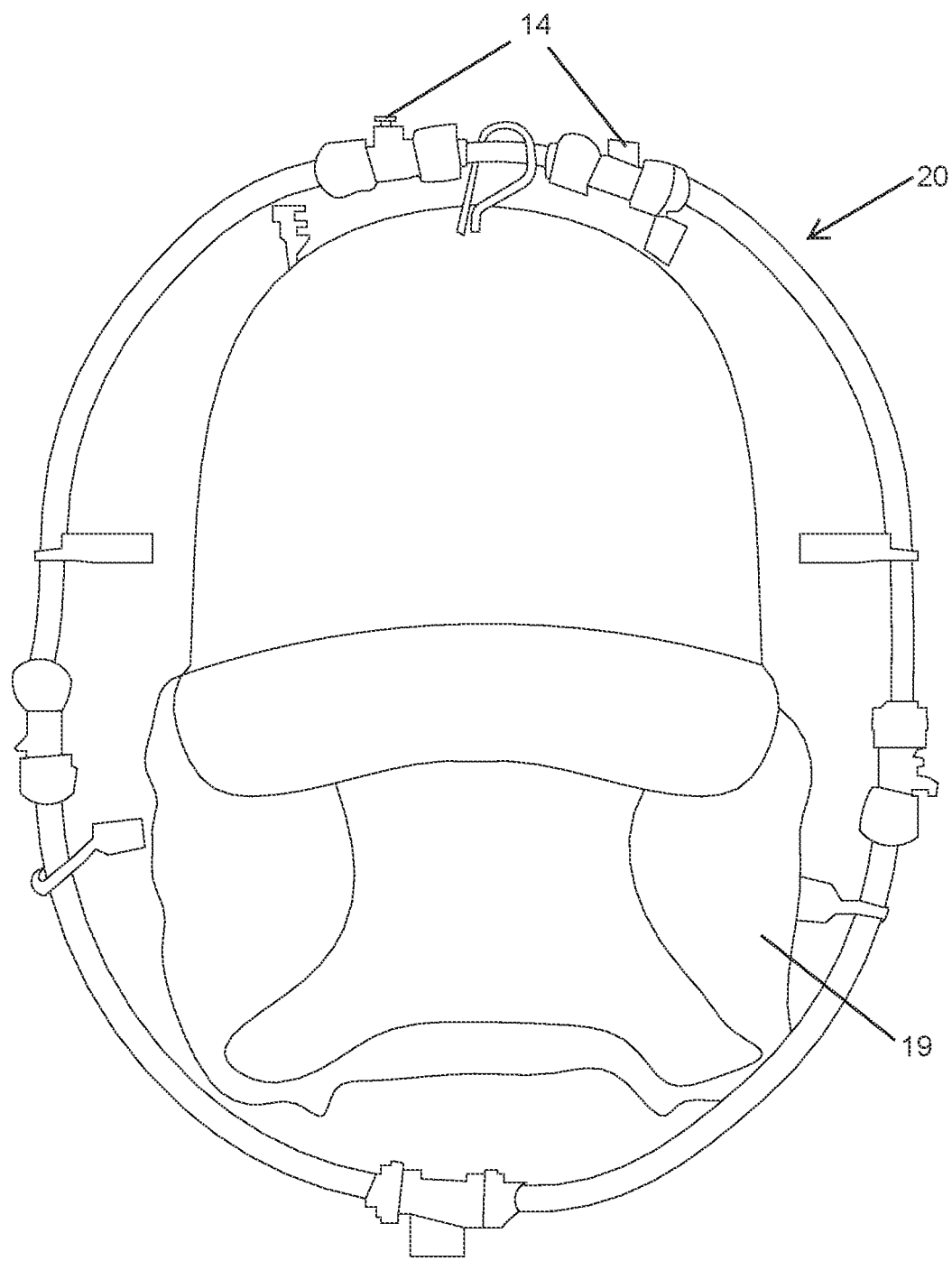
FIG. 11 is an enlarged top plan view of the fluid distribution tube and nozzles affixed to a headwear, in accordance with a non-limiting exemplary embodiment of the present disclosure.
Figure 12:
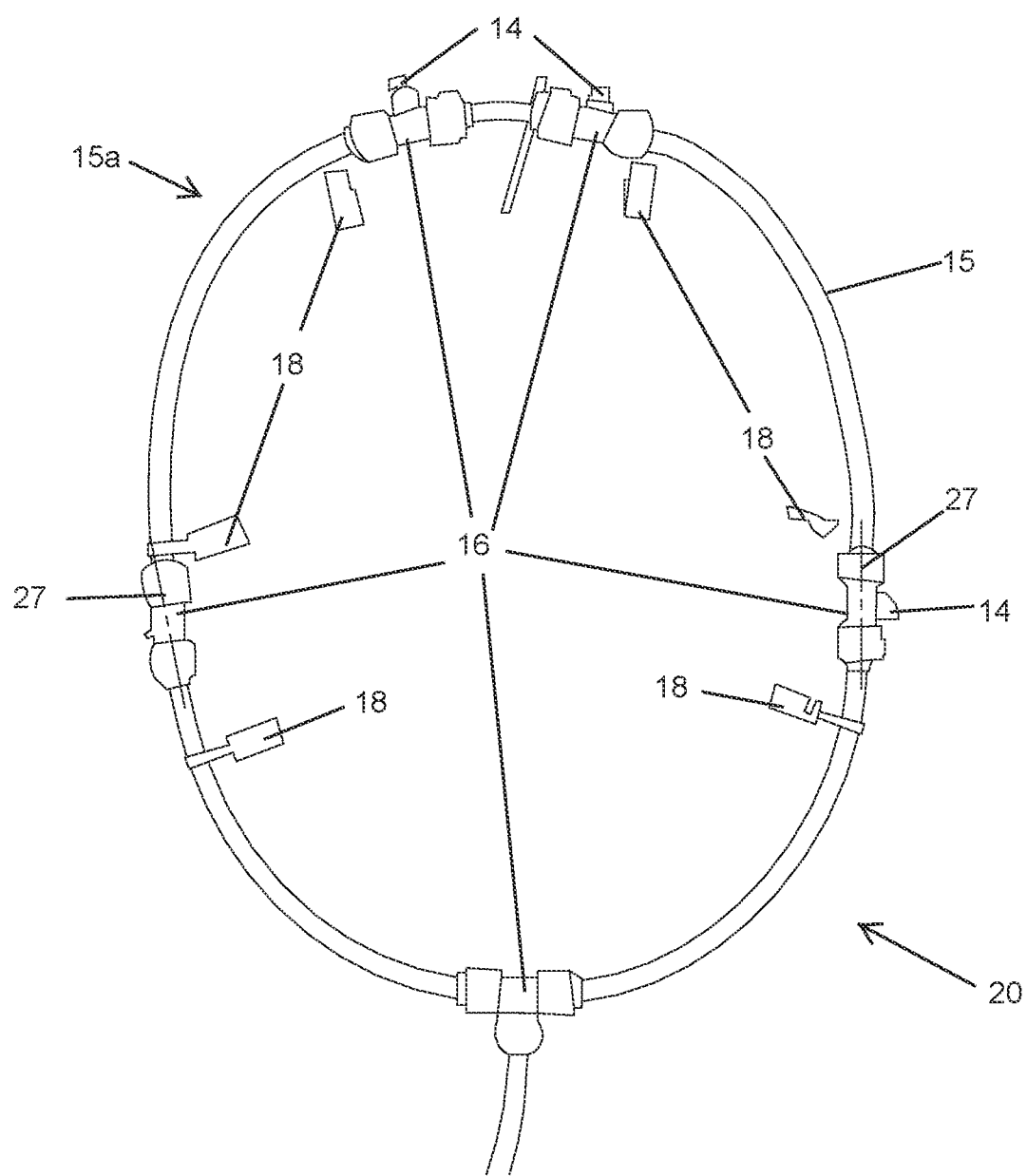
FIG. 12 is another enlarged top plan view of the fluid distribution tube and nozzles affixed thereto as shown in FIG. 11.
Figure 13:
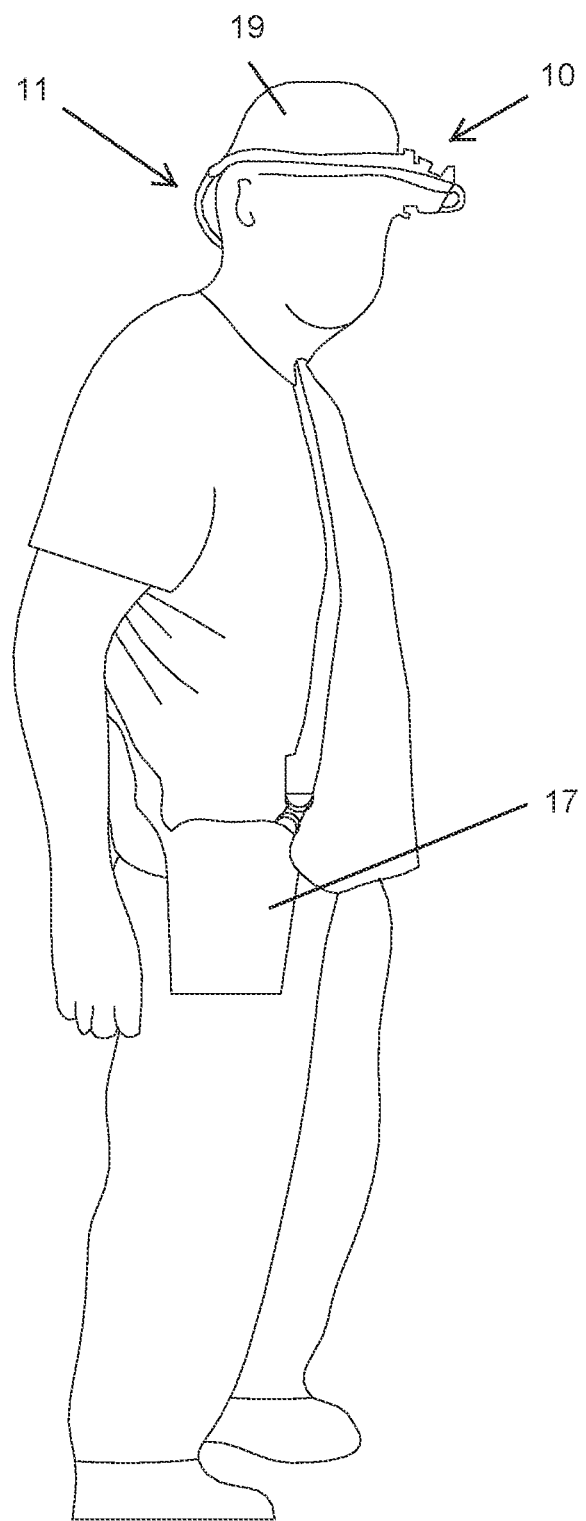
FIG. 13 is a perspective view of the personal mister system having a shoulder strap supported over a user's shoulders, in accordance with a non-limiting exemplary embodiment of the present disclosure.
Figure 14:
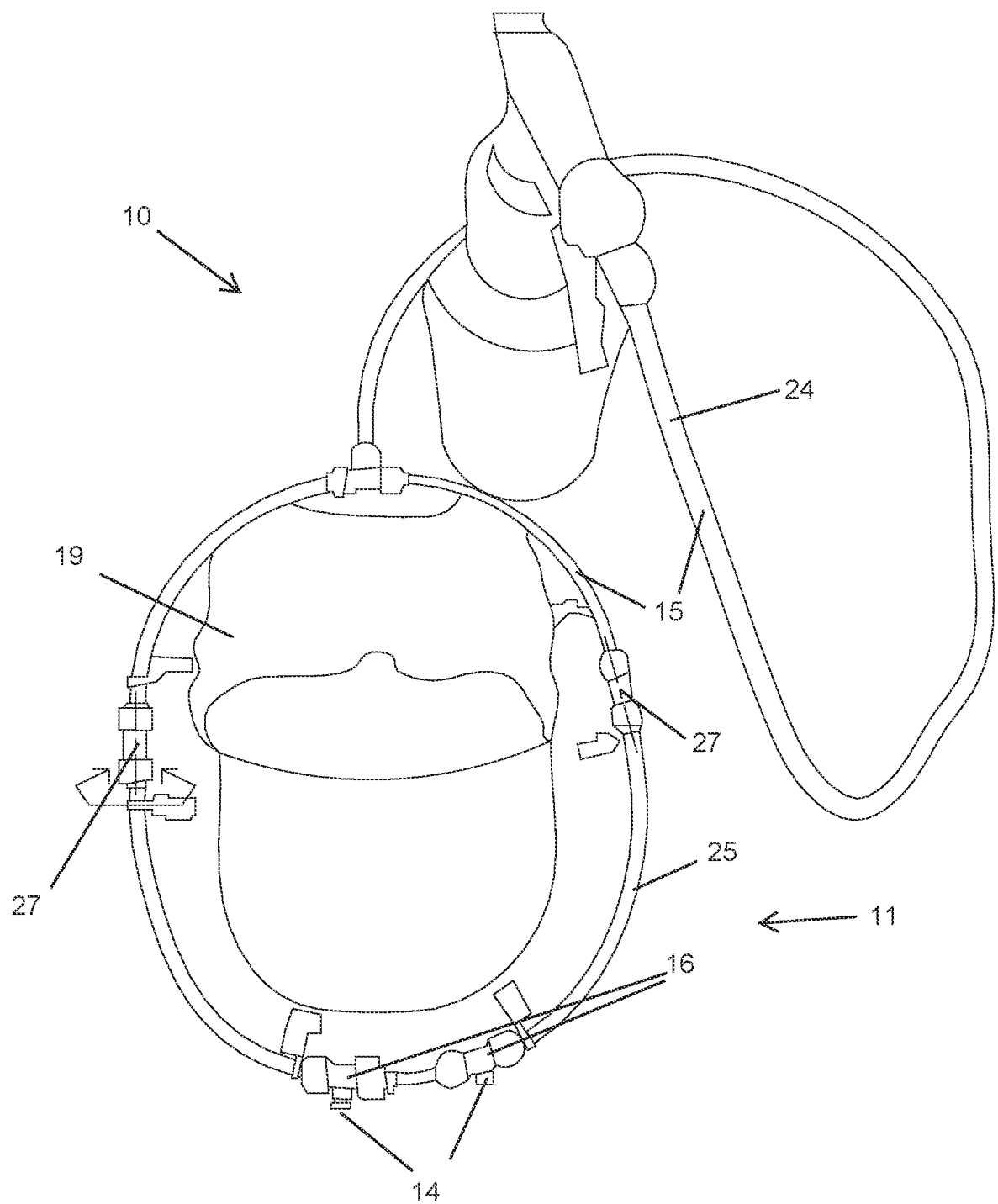
FIG. 14 is a top plan view of the personal mister system affixed to a headwear, in accordance with a non-limiting exemplary embodiment of the present disclosure.
Figure 15:
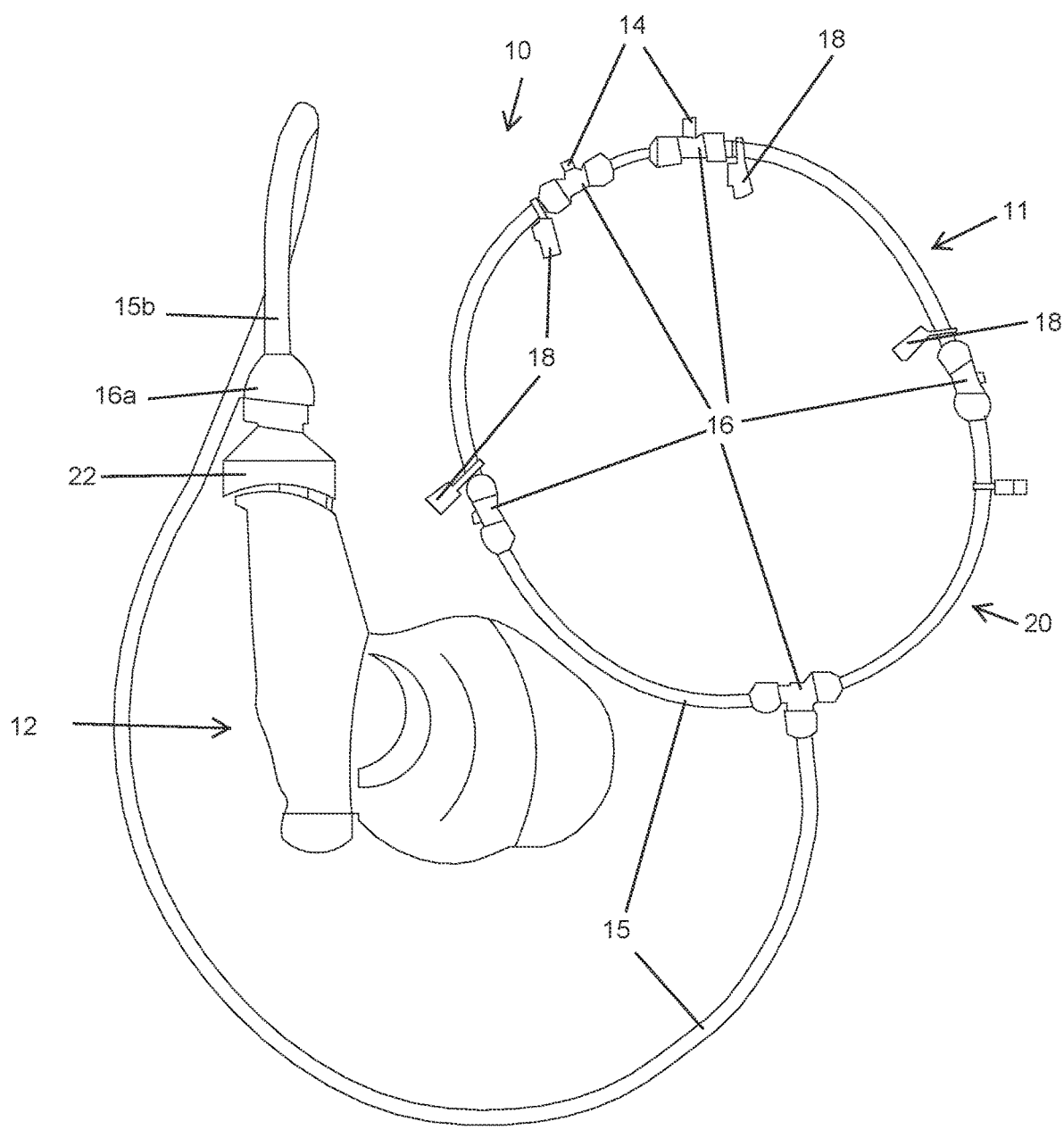
FIG. 15 is another top plan view of the personal mister system shown in FIG. 14 without the headwear, in accordance with a non-limiting exemplary embodiment of the present disclosure.
Figure 16:
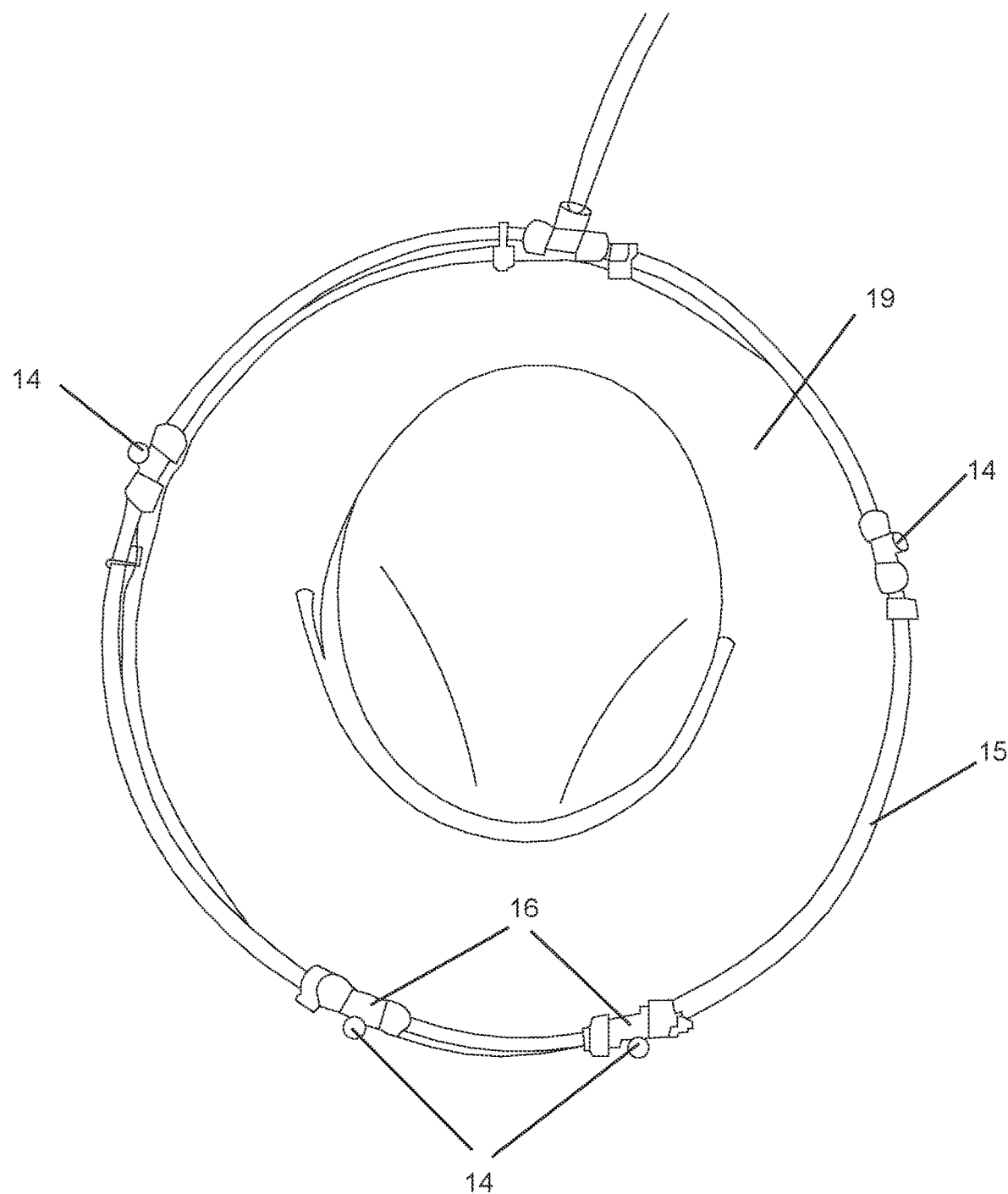
FIG. 16 is another top plan view of the personal mister system affixed to another headwear, in accordance with a non-limiting exemplary embodiment of the present disclosure.
Figure 17:
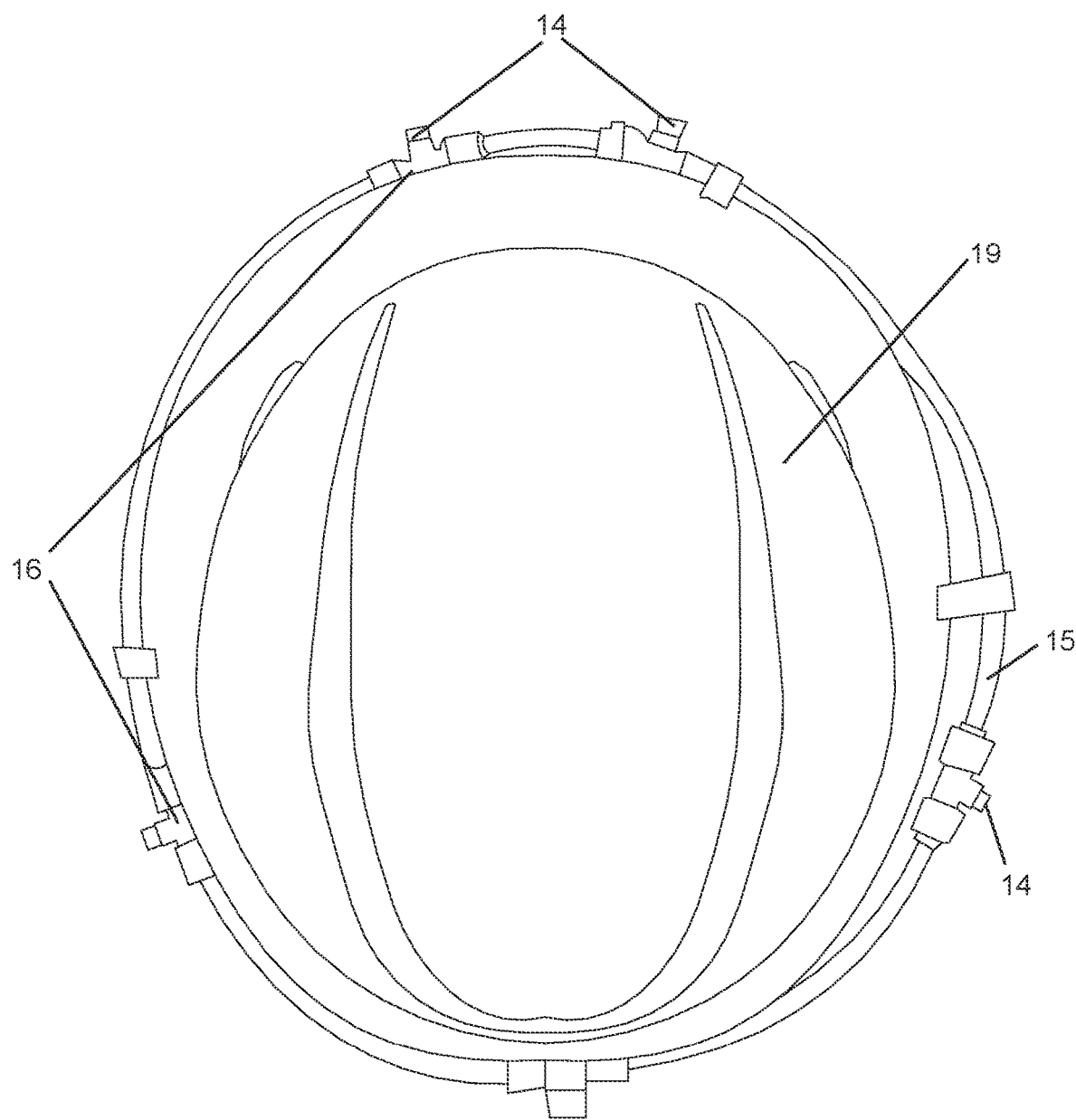
FIG. 17 is another top plan view of the personal mister system affixed to another headwear, in accordance with a non-limiting exemplary embodiment of the present disclosure.
Figure 18:
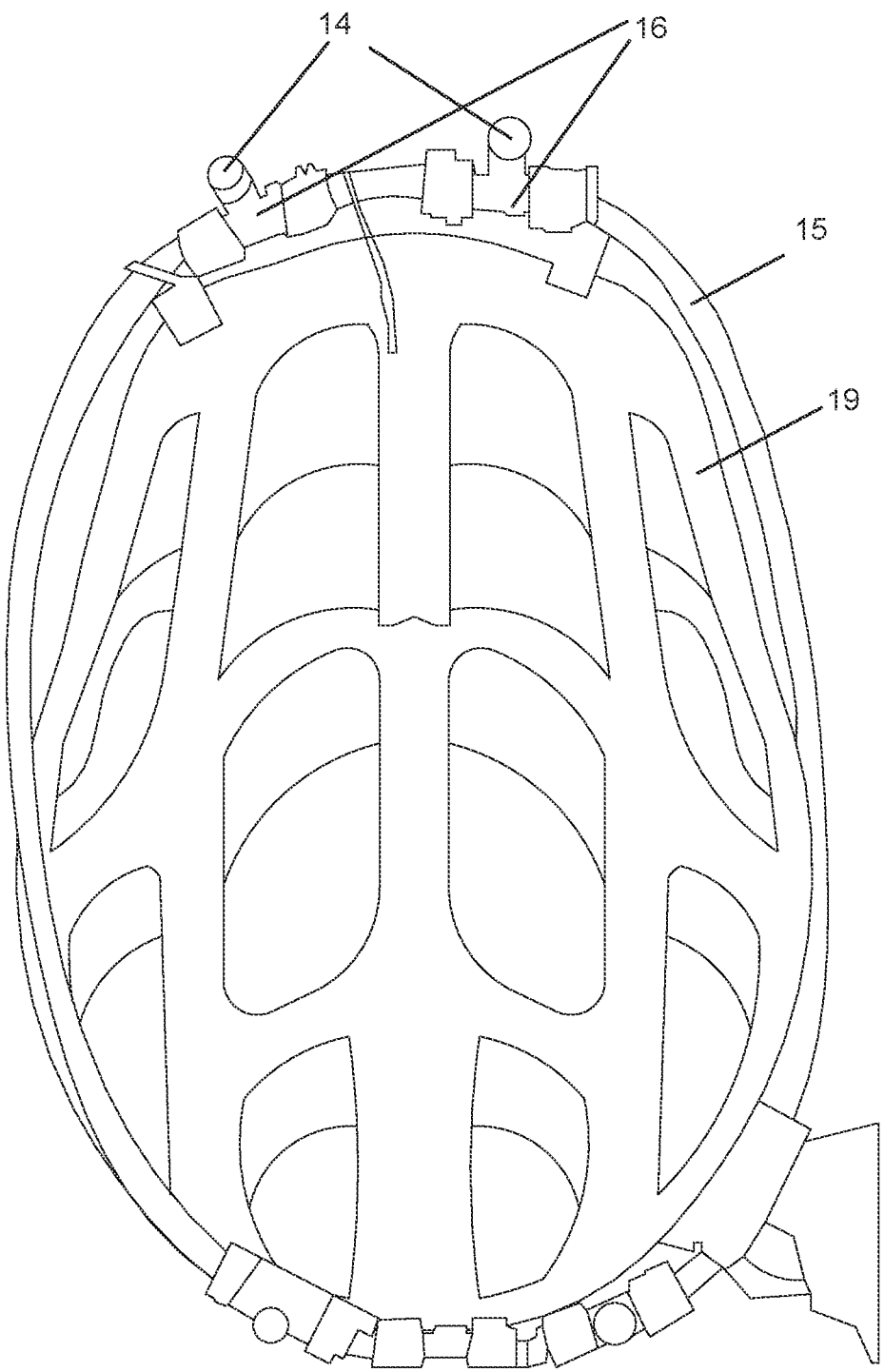
FIG. 18 is another top plan view of the personal mister system affixed to another headwear, in accordance with a non-limiting exemplary embodiment of the present disclosure.
Figure 19:
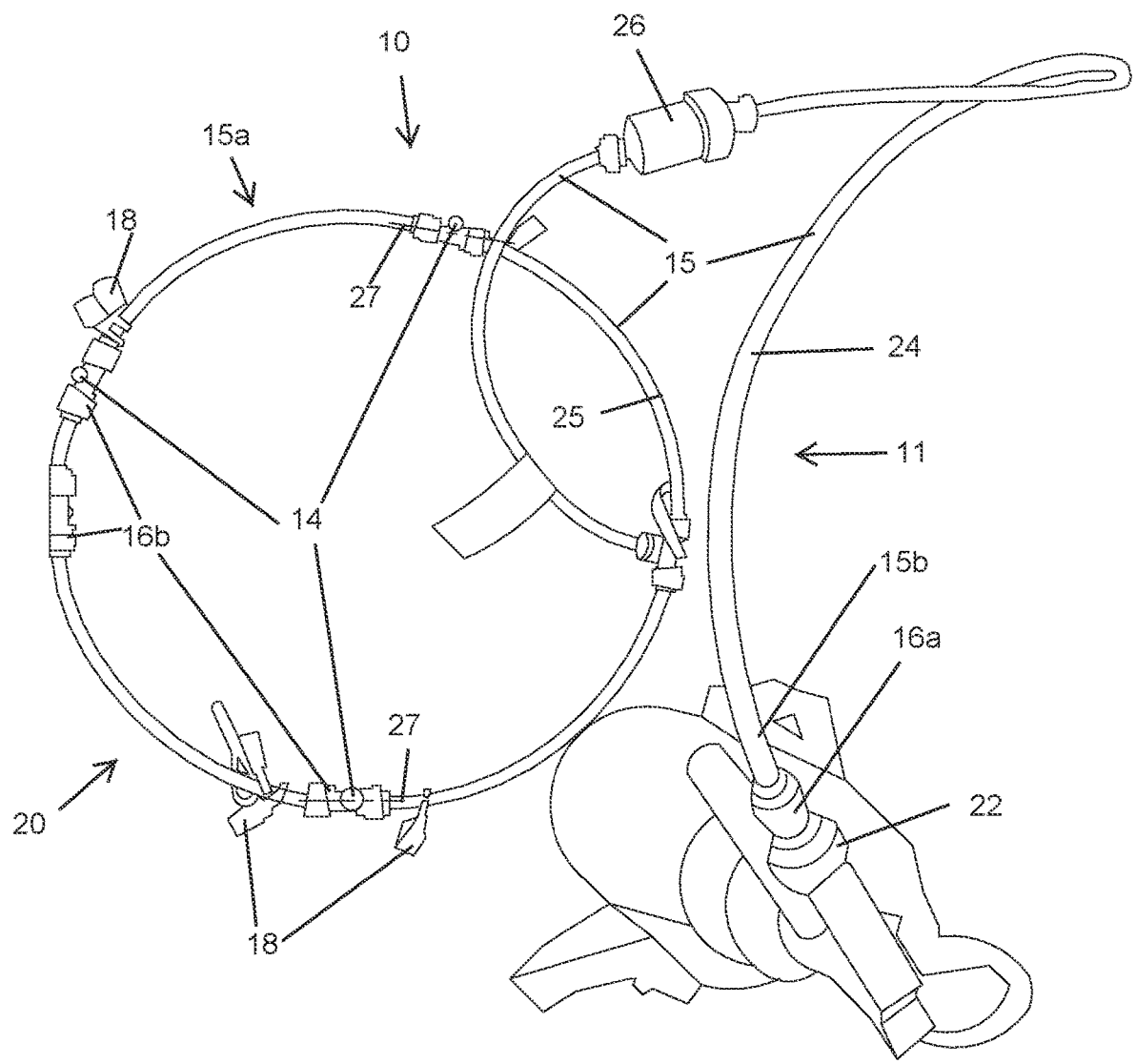
FIG. 19 is another top plan view of the personal mister system shown without the headwear, in accordance with a non-limiting exemplary embodiment of the present disclosure.
Figure 20:
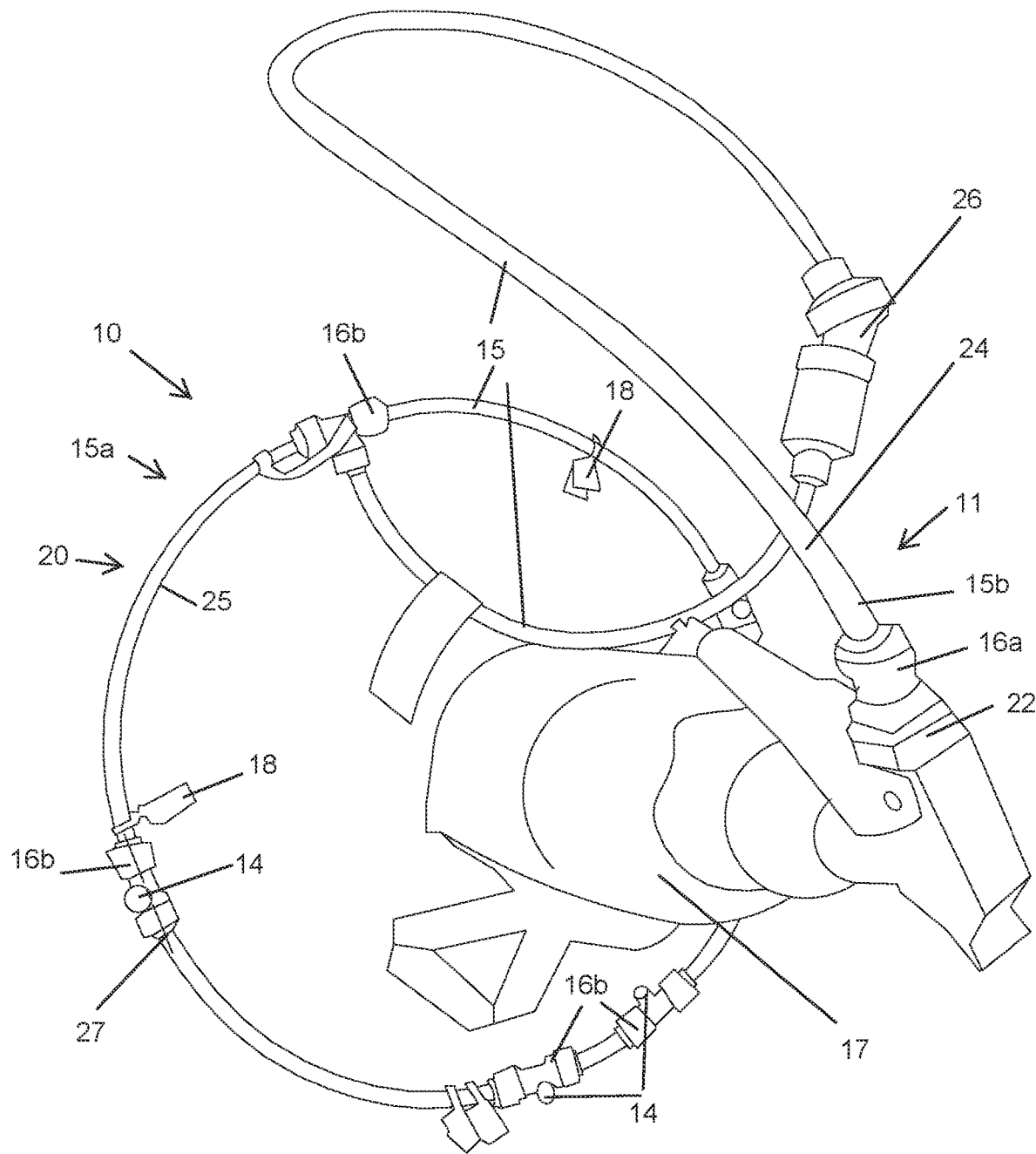
FIG. 20 is another perspective view of the personal mister system employing a water filter as shown in FIG. 19, in accordance with a non-limiting exemplary embodiment of the present disclosure.
Figure 21:
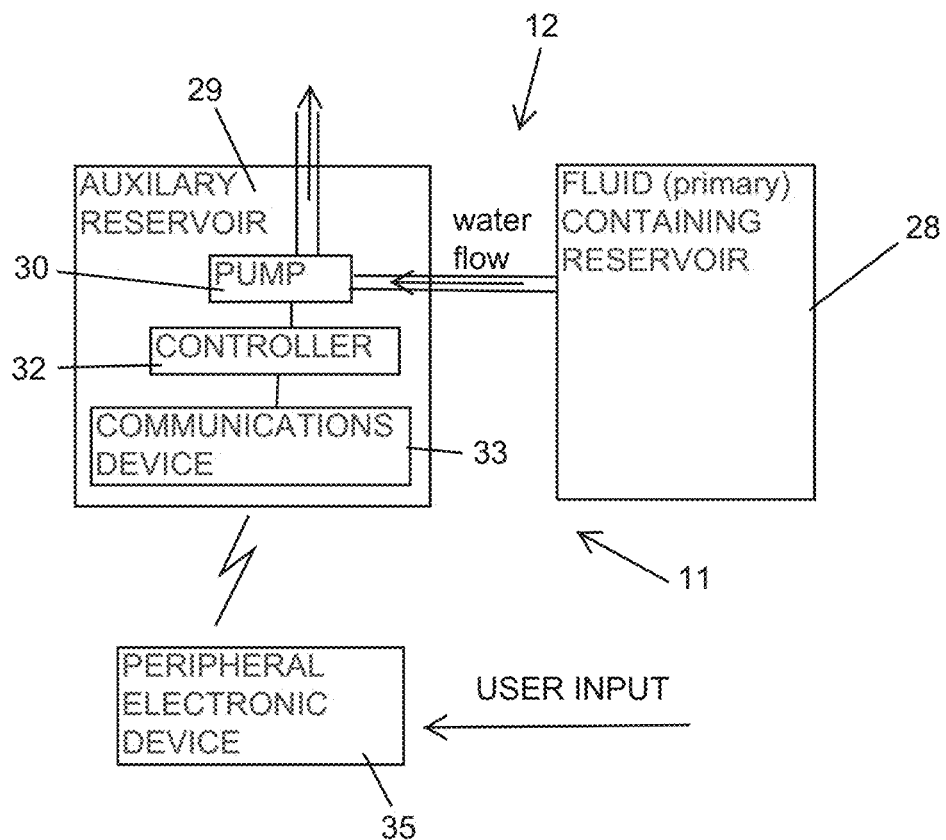
FIG. 21 is high level schematic block diagram showing the interrelationship between the major electronic components, in accordance with a non-limiting exemplary embodiment of the present disclosure.

In an alternative embodiment, FIG. 21, the system 10 is battery operated and the spray bottle 12 may host batteries and a water transfer pump powered by the batteries 36. The batteries and water transfer pump may be housed within a detachable base portion of the spray bottle 12, as shown in FIG. 6. The water transfer pump is configured to deliver water to the series of mist nozzles for quickly cooling a user on demand.

In yet another embodiment, the personal mister system 10 includes a backpack insulated water carrier to hold up to 64 oz of water. Manual start and stop buttons may be included for manually activating and deactivating the system. Alternatively, the personal mister system 10 may include BLUETOOTH® voice command functions for activating and deactivating the device. The backpack insulated water carrier is shown in detail in FIGS. 8-9.

Additional components which may be included in alternative embodiments:
Battery powered pump with solar recharge
Submersible pump
Software application to set a timer including designated times to start and shut off automatically
Poly corrugated tubing to adjust to one size fits all
All quick connect fittings reshaped and sized to fit any poly tubing size
Polyethylene clear tubing
3-way union tee quick connect (coupling) push
Brass misting nozzles with (10/24 thread 0.4 mm orifice, to be made of a lighter material such as plastic)
Heavy-duty stainless-steel metal alligator clips with hooks
15/8-inch slip lock outdoor plastic misting nozzle tee with 10/24-inch thread quick connect push
Copolymer fitting adaptor 15/8" tube OD×15/8" NPTF female quick connect push
Gauge indicating low water level in bladder in backpack FIGS. 15-18, show additional views of the personal mister system 10 and the various configurations for use with hard hats, baseball caps, and other headwear 19. Benefits and improvements provided by the misting system include handsfree operation following squeezing of the trigger 13 of the spray bottle 12, 360 degree misting above and around a user's head which dissipates down to the rest of a user's body allowing for more cooling area. Additionally, the device may be fitted with different lengths of poly tubing for use with a baseball cap, helmet, hard hat, straw hat, and other headwear 19 as shown in the figures.

In a non-limiting exemplary embodiment, the device provides immediate cooling through a misting system including mister nozzles connected to circular tubing attached to a cap or hat by depressing the spray bottle trigger 13 located on the spray bottle 12. The mist spreads down to a user's shoulders rather than being directed to a user's face. The system 10 is manually operated therefore eliminating the need for batteries or other powering means. The water is delivered directly to a circular portion of tubing attached to a hat selected by the user. The system is configured to be used with baseball caps or safari style hats. The spray bottle 12 of the misting system may be refillable. Additionally, a carrier is provided for supporting the spray bottle 12 in a convenient hands-free manner.

In other embodiments, the misting system is provided for attachment to a floor fan with tubing connected to a garden hose and may be used to cool an area such as a patio setting. In this embodiment, the misting system also includes a circular section 15a of tubing and preferably misting nozzles positioned along the circular section of tubing.

In a non-limiting exemplary embodiment, the system provides a 360-degree mist flowing down to shoulder level while attached to a user's cap or hat providing shade. The spray bottle 12 having the trigger 13 is carried within an insulated canvas carrier or other carrier with a shoulder strap.

In a non-limiting exemplary embodiment, the personal mister system 10 may be operated by squeezing the trigger 13 on the bottle as needed, which urges fluid flow along a 360-travel path. The fluid is discharged above and around a user head such that the fluid is dissipated as a mist down to the rest of the user body, allowing for more cooling area, rather than directly into the face only. The personal mister system 10 can be retrofitted onto various headwear 19 such as: a baseball cap, a straw hat, a bike helmet, a visor, a construction hard hat, etc.

In a non-limiting exemplary embodiment, benefits and improvements provided by the misting system include hands free operation following squeezing of the spray bottle trigger 13, 360 degree misting above and around a user's head which dissipates down to the rest of a user's body allowing for more cooling area. Additionally, the device may be fitted with different lengths of poly tubing for use with a baseball cap, helmet, hard hat, straw hat, and other headwear 19.

In a non-limiting exemplary embodiment, the personal water mister may include one or more of the following components: a rechargeable solar power supply; an insulated reservoir; an auxiliary reservoir 29 detachably mated to the primary water retaining reservoir 28; a water pump 34, a controller 32 responsive to user inputs via a mechanical user interface; a software application configured to activate/deactivate the controller 32 based upon receiving electronic user inputs via a peripheral electronic device (e.g., BLUETOOTH® enabled smart phone, etc.); a timer configured to automatically activate/deactivate the water pump 34; and an alarm for notifying the user when the water level is below a minimum threshold water level.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A personal mister system comprising: a mist delivery assembly including
   a spray bottle having a trigger;
   a plurality of water-misting nozzles;
   a fluid distribution tube in fluid communication with said spray bottle and said water-misting nozzles;
   a plurality of couplings removably affixed to said water-misting nozzles and said fluid distribution tube;
   wherein said fluid distribution tube is configured to evenly and uniformly deliver water, when said trigger is actuated, from said spray bottle to said water-misting nozzles positioned along a distal end of said fluid distribution tube oriented in a circular configuration;
   a bottle carrier configured to support said spray bottle at a user body; and
   a plurality of fasteners affixed to said fluid distribution tube;
   wherein said fluid distribution tube is removably attached to an existing user headwear via said fasteners.

2. The personal mister system of claim 1, wherein said water-misting nozzles are equidistantly spaced apart along a circumferential length of said distal end of said fluid distribution tube, wherein said water-misting nozzles are aligned in a circular configuration.

3. The personal mister system of claim 1, wherein said couplings comprise:
   a first coupling removably affixed to an egress spout of said spray bottle and a proximal end of said fluid distribution tube; and
   a group of second couplings directly connected to said water-misting nozzles and equidistantly spaced apart along a circumferential length of said distal end of said fluid distribution tube.

4. The personal mister system of claim 3, wherein said group of second couplings are coextensively shaped.

5. The personal mister system of claim 1, wherein said proximal end of said fluid distribution tube is flexible and has a first diameter, said distal end of said fluid distribution tube is flexible and has a second diameter; wherein said second diameter is smaller than said first diameter.

6. The personal mister system of claim 5, further comprising: a filter intermediately positioned between said proximal end and said distal end of said fluid distribution tube.

7. The personal mister system of claim 3, wherein each of said water-misting nozzles and an associated one of said group of second couplings are selectively and contemporaneously rotated about an axis defined along a longitudinal length of said distal end of said fluid distribution tube such that mist is channeled downwardly towards a target zone of the user.

8. The personal mister system of claim 7, wherein each of said water-misting nozzles and said associated one of said group of second couplings are disposed exterior of the existing user headwear.

9. The personal mister system of claim 1, wherein said spray bottle comprises: a primary water retaining reservoir, and an auxiliary reservoir removably attached to said primary water retaining reservoir;
   wherein said mist delivery assembly further comprises:
      a water pump, a controller, and a communications device operably situated within said auxiliary reservoir, said water pump being in fluid communication with said primary water retaining reservoir, and
      an auxiliary electronic device located exterior of said spray bottle and being in operable communication with said communications device, said auxiliary electronic device being configured to toggle said pump between operating and non-operating modes, respectively, for selective discharge of fluid out from said primary water retaining reservoir and to said water-misting nozzles.

10. A personal mister system comprising: a mist delivery assembly including
   a spray bottle having a trigger;
   a plurality of water-misting nozzles;
   a fluid distribution tube in fluid communication with said spray bottle and said water-misting nozzles;
   a plurality of couplings removably affixed to said water-misting nozzles and said fluid distribution tube;
   wherein said fluid distribution tube is configured to evenly and uniformly deliver water, when said trigger is actuated, from said spray bottle to said water-misting nozzles positioned along a distal end of said fluid distribution tube oriented in a circular configuration;
   a bottle carrier configured to support said spray bottle at a user body; and
   a plurality of fasteners affixed to said fluid distribution tube;
   wherein said fluid distribution tube is removably attached to an existing user headwear via said fasteners;
   wherein said plurality of water-misting nozzles are located downstream of said spray bottle and thereabove while employed by the user.

11. The personal mister system of claim 10, wherein said water-misting nozzles are equidistantly spaced apart along a circumferential length of said distal end of said fluid distribution tube, wherein said water-misting nozzles are aligned in a circular configuration.

12. The personal mister system of claim 10, wherein said couplings comprise:
   a first coupling removably affixed to an egress spout of said spray bottle and a proximal end of said fluid distribution tube; and
   a group of second couplings directly connected to said water-misting nozzles and equidistantly spaced apart along a circumferential length of said distal end of said fluid distribution tube.

13. The personal mister system of claim 12, wherein said group of second couplings are coextensively shaped.

14. The personal mister system of claim 10, wherein said proximal end of said fluid distribution tube is flexible and has a first diameter, said distal end of said fluid distribution tube is flexible and has a second diameter; wherein said second diameter is smaller than said first diameter.

15. The personal mister system of claim 14, further comprising: a filter intermediately positioned between said proximal end and said distal end of said fluid distribution tube.

16. The personal mister system of claim 12, wherein each of said water-misting nozzles and an associated one of said group of second couplings are selectively and contemporaneously rotated about an axis defined along a longitudinal length of said distal end of said fluid distribution tube such that mist is channeled downwardly towards a target zone of the user.

17. The personal mister system of claim 16, wherein each of said water-misting nozzles and said associated one of said group of second couplings are disposed exterior of the existing user headwear.

18. The personal mister system of claim 10, wherein said spray bottle comprises: a primary water retaining reservoir, and an auxiliary reservoir removably attached to said primary water retaining reservoir;
   wherein said mist delivery assembly further comprises:
      a water pump, a controller, and a communications device operably situated within said auxiliary reservoir, said water pump being in fluid communication with said primary water retaining reservoir, and
      an auxiliary electronic device located exterior of said spray bottle and being in operable communication with said communications device, said auxiliary electronic device being configured to toggle said pump between operating and non-operating modes, respectively, for selective discharge of fluid out from said primary water retaining reservoir and to said water-misting nozzles.

\* \* \* \* \*